Sept. 1, 1931. J. J. STOETZEL 1,821,857
DISPATCH TUBE APPARATUS
Filed Oct. 4, 1928
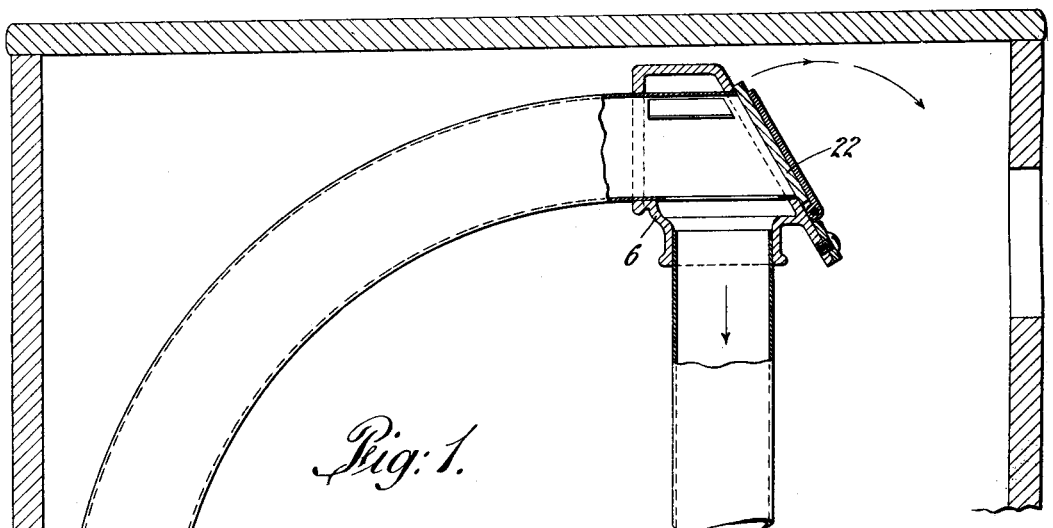
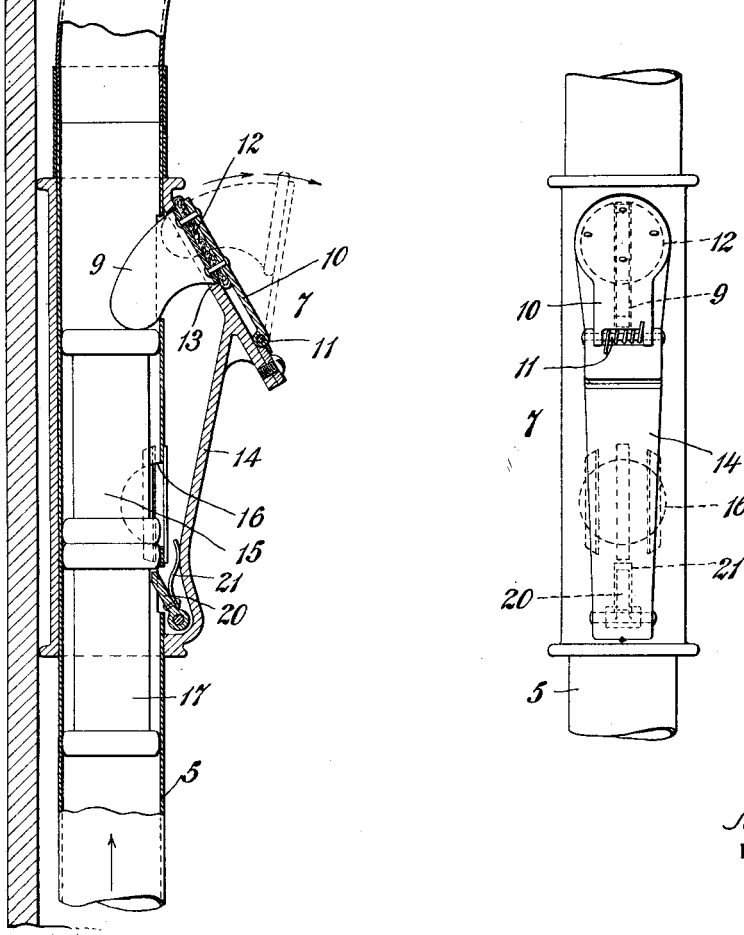
INVENTOR
JOSEPH J. STOETZEL
BY Merrell E Clark
ATTORNEY Patented Sept. 1, 1931

1,821,857

UNITED STATES PATENT OFFICE

JOSEPH JOHN STOETZEL, OF QUEENS VILLAGE, NEW YORK, ASSIGNOR TO G. & G. ATLAS SYSTEMS, INC., OF NEW YORK, N. Y., A CORPORATION OF NEW YORK

DISPATCH TUBE APPARATUS

Application filed October 4, 1928. Serial No. 310,323.

The present invention relates to pneumatic dispatch service systems and has for an object to provide an improved delivery apparatus.

In the operation of pneumatic dispatch systems it frequently happens that the carriers approach the delivery apparatus in groups of two or more and it is desirable to provide means whereby the grouped carriers may be separated so that they will arrive at the delivery apparatus one by one. It is also desirable under some conditions to provide means for giving the carrier an additional impulse in order that its velocity may be increased as it approaches the delivery apparatus. The provision of such means is especially desirable in long dispatch tubes or where the carriers approach the delivery apparatus after travelling vertically upward a considerable distance for the reason that the speed of the carrier may well be reduced to such a point that it will not effectively operate the delivery apparatus, for example the pop terminal delivery door. Long letter carriers also are likely to operate ineffectively unless such an additional impulse can be given thereto.

The present invention provides an apparatus which acts both to separate grouped carriers and to give an additional impulse to each carrier as it passes the apparatus.

The nature and objects of the invention will be better understood from a description of a particular embodiment for the purpose of which description reference should be had to the accompanying drawings forming a part hereof and in which—

Figure 1 is a sectional view of an apparatus embodying the invention, and

Figure 2 is a view in elevation of the valve arrangement.

The apparatus shown for the purpose of illustrating the principles of the invention comprises a device which is arranged to separate grouped carriers and to give to the forward carrier an additional impulse whereby its velocity will be increased. In the structure illustrated the apparatus is shown as arranged in advance of a delivery apparatus but it will be understood that this arrangement is illustrative merely.

As shown a vertical pneumatic tube 5 leading to a delivery station 6 is provided with a device 7 arranged to automatically admit air behind a passing carrier. In view of the fact that the air in advance of the carrier is rarefied by the suction of the system this admission of atmospheric air will give an additional impulse to the carrier to cause it to travel at a higher velocity. If the carrier is followed by a second carrier, this admission of atmospheric air behind the first carrier and in advance of the second carrier will also cause the second carrier to be retarded because the air in the system behind the carrier will be more or less rarefied.

In the apparatus particularly shown a trip member 9 is connected to or forms a part of an arm 10 which is pivoted at 11 and which carries a valve 12 covering an aperture 13 in a casing 14 surrounding and attached to the tube 5. When said trip member 9 is engaged by a moving carrier 15 the opening of the valve 12 admits air to the casing and from the casing through a grid or aperture 16 to the tube 5, this aperture being so positioned that the air will be admitted behind the passing carrier 15 and ahead of a following carrier 17, if any.

In order to prevent a second carrier 17 from retrograde movement when the air is admitted ahead of it a pawl 20 with a spring 21 is positioned to engage the forward band of the carrier.

At the top of the tube is shown a delivery station comprising a pop terminal delivery door 22 of usual construction.

The foregoing particular description is illustrative merely and is not intended as defining the limits of the invention.

I claim—

1. In a pneumatic tube dispatch system, the combination with a dispatch tube of a device for separating two carriers in the dispatch tube comprising a trip member projecting into the path of a carrier and a valve arranged to be opened upon engagement of the trip member by the carrier to admit air between said carriers.

2. Apparatus as defined in the preceding claim having means for preventing retrograde movement of the second carrier.

3. In a pneumatic tube dispatch system, the combination with a vertical tube of a trip member engageable by a carrier therein and means actuated thereby for admitting air to the tube, together with a pawl arranged to engage a carrier to prevent downward movement of the carrier.

4. In a pneumatic dispatch system, the combination with a pneumatic dispatch tube having a delivery outlet of means remote from said outlet operated by a passing carrier for admitting air to the dispatch tube behind the carrier comprising a trip member, a valve arranged to be opened by said trip member and held open while the carrier is passing the trip member and then closed prior to the delivery of the carrier.

5. In a pneumatic dispatch system, the combination with a pneumatic dispatch tube having a delivery outlet of a port for admitting air to the dispatch tube behind the carrier, a trip member positioned in advance of the port and arranged to be actuated during the passage of a carrier to open a valve to admit air behind said carrier during passage of the carrier and to close said valve immediately after passage of the carrier and before it reaches said outlet.

6. In a pneumatic tube dispatch system, the combination with a dispatch tube of a device for separating two carriers in the dispatch tube comprising a port in the wall of the tube, a trip member projecting into the path of the carrier in advance of said port, and a valve for admitting air to said port arranged to be opened on engagement of the trip member by the carrier and to be held open only while a carrier is passing said trip member.

In testimony whereof, I have signed my name to this specification this 29th day of September, 1928.

JOSEPH JOHN STOETZEL.